United States Patent
Yu et al.

(10) Patent No.: US 11,408,395 B2
(45) Date of Patent: Aug. 9, 2022

(54) METHOD AND DEVICE FOR DETECTING ACTIVE POWER OF WIND TURBINE

(71) Applicant: BEIJING GOLDWIND SCIENCE & CREATION WINDPOWER EQUIPMENT CO., LTD., Beijing (CN)

(72) Inventors: Mengting Yu, Beijing (CN); Guilin Zhou, Beijing (CN); Mei Han, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 584 days.

(21) Appl. No.: 16/339,207

(22) PCT Filed: Apr. 11, 2018

(86) PCT No.: PCT/CN2018/082677
§ 371 (c)(1),
(2) Date: Apr. 3, 2019

(87) PCT Pub. No.: WO2019/119681
PCT Pub. Date: Jun. 27, 2019

(65) Prior Publication Data
US 2021/0340951 A1   Nov. 4, 2021

(30) Foreign Application Priority Data
Dec. 19, 2017   (CN) .......................... 201711373920.8

(51) Int. Cl.
*F03D 7/00* (2006.01)
*F03D 7/02* (2006.01)
(Continued)

(52) U.S. Cl.
CPC ............. *F03D 7/028* (2013.01); *F03D 7/043* (2013.01); *F03D 9/255* (2017.02);
(Continued)

(58) Field of Classification Search
CPC .......... F03D 7/028; F03D 9/255; F03D 7/043; F05B 2270/327; F05B 2270/32;
(Continued)

(56) References Cited

U.S. PATENT DOCUMENTS 10,914,286 B2 *  2/2021  Engelken ............... F03D 7/0284
2007/0018510 A1   1/2007  Cardinal et al.
(Continued)

FOREIGN PATENT DOCUMENTS

CA   3011771 A1   8/2017
CN   1997824 A    7/2007
(Continued)

OTHER PUBLICATIONS

Shibashis Bhowmik, et al; "Performance Optimization for Doubly Fed Wind Power Generation Systems", IEEE Transactions on Industry Applications, vol. 35, No. 4, Jul./Aug. 1999, pp. 949-958.
(Continued)

*Primary Examiner* — Julio C. Gonzalez

(57) ABSTRACT

A method and a device for detecting an active power of a wind turbine. The method includes: acquiring a current rotation speed of a rotor of a wind turbine and a current outputted active power; determining an effective wind speed of the wind turbine; determining a maximum active power capable to be captured by the wind turbine at the current rotation speed; determining a maximum active power capable to be outputted by the wind turbine, and determining a release power at which the wind turbine is capable to release a rotation kinetic energy of the wind turbine for a predetermined time at the current rotation speed; and deter-
(Continued)

mining the available active power of the wind turbine, based on the maximum active power capable to be outputted, the release power, and the current outputted active power.

17 Claims, 7 Drawing Sheets

(51) Int. Cl.
F03D 9/25 (2016.01)
F03D 7/04 (2006.01)
(52) U.S. Cl.
CPC ... F05B 2270/1033 (2013.01); F05B 2270/32 (2013.01); F05B 2270/328 (2013.01); F05B 2270/335 (2013.01)
(58) Field of Classification Search
CPC ........ F05B 2270/708; F05B 2270/1033; F05B 2270/335; F05B 2270/328
See application file for complete search history.

(56) References Cited

U.S. PATENT DOCUMENTS

| | | | |
|---|---|---|---|
| 2008/0042442 A1 | 2/2008 | Richter et al. | |
| 2010/0280672 A1 | 11/2010 | Llorente Gonzalez et al. | |
| 2012/0078518 A1 | 3/2012 | Krishna | |
| 2013/0026759 A1 | 1/2013 | Krueger et al. | |
| 2018/0223803 A1* | 8/2018 | Zheng | F03D 7/0224 |
| 2019/0048853 A1 | 2/2019 | Engelken | |
| 2019/0058425 A1* | 2/2019 | De Rijcke | F03D 7/0272 |

FOREIGN PATENT DOCUMENTS

| | | |
|---|---|---|
| CN | 102664422 A | 9/2012 |
| CN | 102664429 A | 9/2012 |
| CN | 103441524 A | 12/2013 |
| CN | 104201707 A | 12/2014 |
| CN | 105909470 A | 8/2016 |
| CN | 106194582 A | 12/2016 |
| CN | 106208161 A | 12/2016 |
| CN | 106907295 A | 6/2017 |
| CN | 106950421 A | 7/2017 |
| EP | 1892412 A | 2/2008 |
| EP | 1746285 A3 | 9/2012 |
| EP | 3187727 A2 | 7/2017 |

OTHER PUBLICATIONS

First Chinese Office Action dated Oct. 21, 2019; Appln. No. 201711373920.8.
Extended European Search Report dated Nov. 19, 2019; Appln. No. 18863807.6.
International Search Report dated Sep. 26, 2018; PCT/CN2018/082677.

* cited by examiner

Lookup table

| $C_p$ | $\beta_1$ | ... | $\beta_n$ |
|---|---|---|---|
| $\lambda_1^3$ | $C_{p11}$ | ... | $C_{p1n}$ |
| ... | ... | ... | ... |
| $\lambda_m^3$ | $C_{pm1}$ | ... | $C_{pmn}$ |

METHOD AND DEVICE FOR DETECTING
ACTIVE POWER OF WIND TURBINE

This application is the national phase of International Application No. PCT/CN2018/082677, titled "METHOD AND DEVICE FOR DETECTING ACTIVE POWER OF WIND TURBINE", filed on Apr. 11, 2018, which claims the priority to Chinese Patent Application No. 201711373920.8, titled "METHOD AND DEVICE FOR DETECTING ACTIVE POWER OF WIND TURBINE", filed on Dec. 19, 2017 with the State Intellectual Property Office of People's Republic of China, the content of which is incorporated herein by reference.

FIELD

The present disclosure relates to the field of wind power generation, and in particular, to a method and a device for detecting an available active power of a wind turbine.

BACKGROUND

As a clean and renewable energy source, wind energy receives more and more attention, and an installation capacity is increasing. With a continuous development of wind power generation technology, various researches on wind turbines are becoming more and more in-depth.

A power system has a process of balancing power generation and load in real time. When a system frequency of the power grid changes greatly due to generator tripping or a sudden change in load, the wind turbine as a power supply is required to provide frequency-regulated power quickly and flexibly, to improve frequency stability. It requires accurate estimation of an available active power of the wind turbine, so as to provide maximum frequency-regulated power to a power grid under a premise of stable operation of the wind turbine.

Therefore, there is a need for a technique to detect the available active power of the wind turbine more accurately.

SUMMARY

According to an aspect of the present disclosure, a method for detecting an available active power of a wind turbine is provided. The method includes: acquiring a current rotation speed of a rotor of a wind power generator of a wind turbine and a current outputted active power of the wind turbine; determining an effective wind speed of the wind turbine, based on the current rotation speed and the current outputted active power; determining a maximum active power capable to be captured by the wind turbine at the current rotation speed, based on the effective wind speed and a maximum utilization-rate coefficient for wind energy of the wind turbine at the current rotation speed; determining a maximum active power capable to be outputted by the wind turbine, based on the maximum active power capable to be captured and a corresponding power loss, and determining a release power, at which the wind turbine is capable to release rotation kinetic energy of the wind turbine for a predetermined time at the current rotation speed; and determining the available active power of the wind turbine, based on the maximum active power capable to be outputted, the release power, and the current outputted active power.

According to another aspect of the present disclosure, a device for detecting an available active power of a wind turbine is provided. The device includes: a parameter acquisition unit, configured to acquire a current rotation speed of a rotor of a wind power generator of a wind turbine and a current outputted active power of the wind turbine; an effective wind speed unit, configured to determine an effective wind speed of the wind turbine, based on the current rotation speed and the current outputted active power; a first power determination unit, configured to determine a maximum active power capable to be captured by the wind turbine at the current rotation speed, based on the effective wind speed and a maximum utilization-rate coefficient for wind energy of the wind turbine at the current rotation speed; a second power determination unit, configured to determine a maximum active power capable to be outputted by the wind turbine, based on the maximum active power capable to be captured and a corresponding power loss, and determine a release power, at which the wind turbine is capable to release rotation kinetic energy of the wind turbine for a predetermined time at the current rotation speed; and a third power determination unit, configured to determine the available active power of the wind turbine, based on the maximum active power capable to be outputted, the release power, and the current outputted active power.

According to another aspect of the present disclosure, a method for detecting an effective wind speed of a wind turbine is provided. The method includes: acquiring a current rotation speed of a rotor of a wind power generator of a wind turbine and a current outputted active power of the wind turbine; determining a current tip speed ratio of the wind turbine, based on the current rotation speed and the current outputted active power; and determining an effective wind speed of the wind turbine based on the current tip speed ratio and the current rotation speed.

According to another aspect of the present disclosure, a device for detecting an effective wind speed of a wind turbine is provided. The device includes: a parameter acquisition unit, configured to acquire a current rotation speed of a rotor of a wind power generator of a wind turbine and a current outputted active power of the wind turbine; a tip speed ratio unit, configured to determine a current tip speed ratio of the wind turbine, based on the current rotation speed and the current outputted active power; and an effective wind speed detecting unit, configured to determine an effective wind speed of the wind turbine based on the current tip speed ratio and the current rotation speed.

According to another aspect of the present disclosure, a system for detecting an available active power of a wind turbine is provided. The system includes: a processor; and a memory storing a computer program, where the computer program when executed by the processor performs the aforementioned method for detecting the available active power of the wind turbine.

According to another aspect of the present disclosure, a system for detecting an effective wind speed of a wind turbine is provided. The system includes: a processor; and a memory storing a computer program, where the computer program when executed by the processor performs the aforementioned method for detecting the effective wind speed of the wind turbine.

According to another aspect of the present disclosure, a computer readable storage medium storing a computer program is provided, where the computer program when executed performs the aforementioned method.

Due to adopting the method for detecting the effective wind speed fast and accurately and considering the rotation kinetic energy, the method, the device, and the system for detecting the available active power of the wind turbine according to the present disclosure can estimate the available active power of the wind turbine accurately. In addition, in case of being applied to determining the available active power for a process of primary frequency regulation of the wind turbine, the detected available active power can meet a requirement on active power of the primary frequency regulation to the most extent, under a premise that the wind turbine operates stably.

BRIEF DESCRIPTION OF THE DRAWINGS

For clearer illustration of technical solutions according to embodiments of the present disclosure, hereinafter are briefly described the drawings to be applied in the embodiments of the present disclosure.

DETAILED DESCRIPTION

Figure 1:
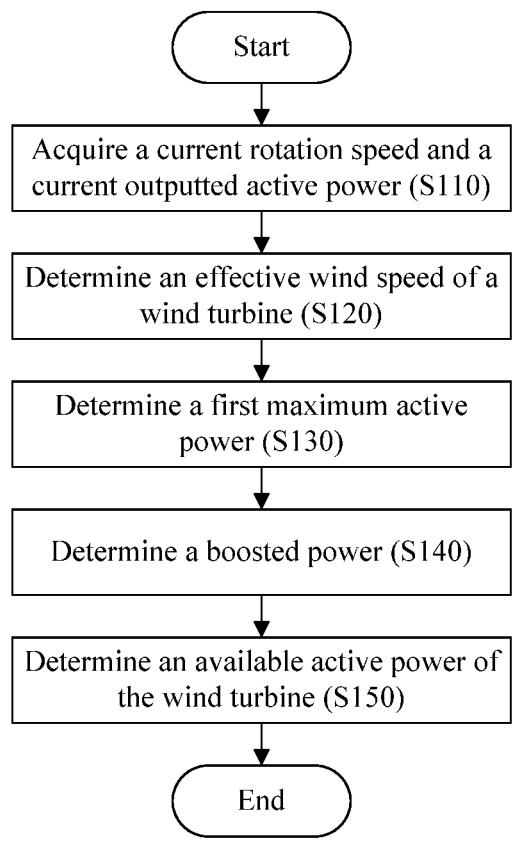
FIG. 1 is a flow chart of a method for detecting an available active power of a wind turbine according to an embodiment of the present disclosure.
Figure 5:
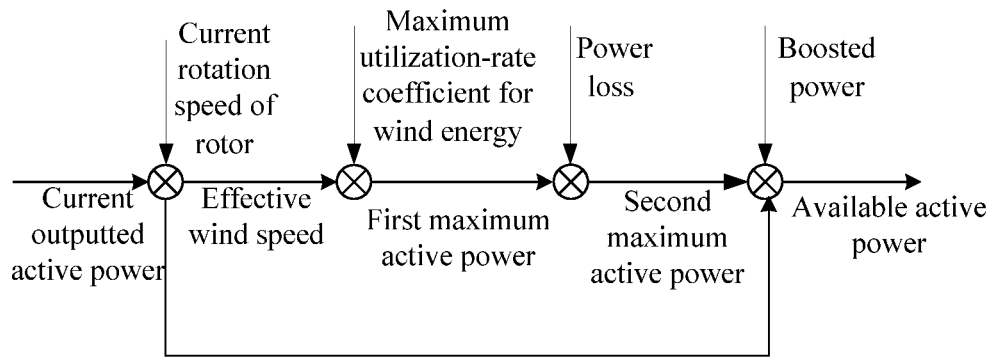
FIG. 5 shows a specific process for determining an available active power of a wind turbine according to an embodiment of FIG. 1.

FIG. 1 illustrates a flow chart of a method for detecting an available active power of a wind turbine according to an embodiment of the present disclosure, and FIG. 5 shows a specific process for determining an available active power of a wind turbine according to the embodiment of FIG. 1.

In step S110, a current rotation speed of a rotor of a wind power generator of the wind turbine and a current outputted active power of the wind turbine are acquired. The current rotation speed of the rotor and the active power currently outputted by the wind turbine may be obtained in various ways, which is not limited by the present disclosure.

In step S120, an effective wind speed of the wind turbine is determined based on the current rotation speed and the current outputted active power.

The effective wind speed of the wind turbine may be determined based on various relationships between the current rotation speed the current outputted active power and the effective wind speed of the wind turbine.

Figure 2:
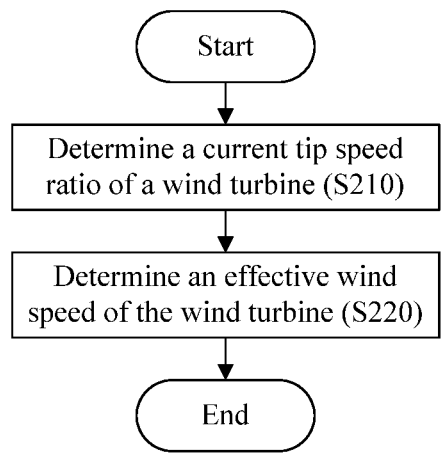
FIG. 2 is a flow chart of a method for determining an effective wind speed of a wind turbine according to an embodiment of the present disclosure.
Figure 6:
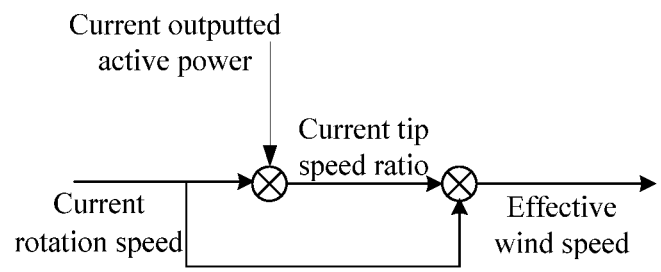
FIG. 6 shows a specific process for determining an effective wind speed of a wind turbine according to an embodiment of FIG. 2.

Hereinafter an embodiment for determining an effective wind speed of a wind turbine according to the present disclosure is described with reference to FIG. 2. Moreover, FIG. 6 shows a specific process for determining an effective wind speed of a wind turbine according to the embodiment of FIG. 2.

In step S210, a current tip speed ratio of the wind turbine is determined based on the current rotation speed and the current outputted active power. The tip speed ratio may be determined based on various relationships between a rotation speed and an outputted active power.

Hereinafter an embodiment for determining a current tip speed ratio of a wind turbine according to the present disclosure is described with reference to FIG. 3.

Figure 3:
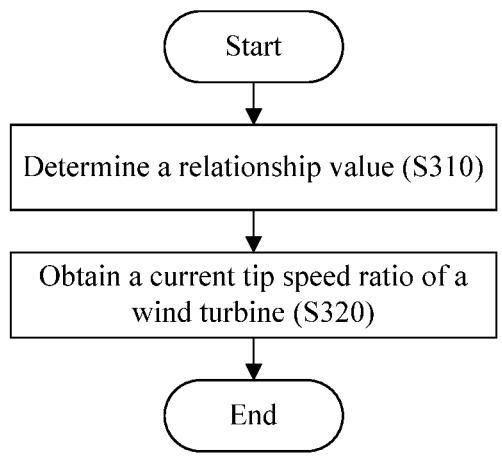
FIG. 3 is a flow chart of a method for determining a current tip speed ratio of a wind turbine according to an embodiment of the present disclosure.
Figure 7:
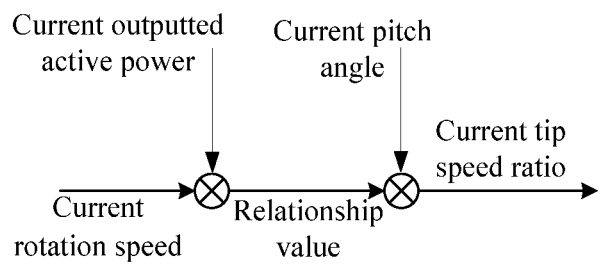
FIG. 7 shows a specific process for determining a current tip speed ratio of a wind turbine according to an embodiment of FIG. 3.

FIG. 3 illustrates a flow chart of a method for determining a current tip speed ratio of a wind turbine according to an embodiment of the present disclosure. Moreover, FIG. 7 shows a specific process for determining a current tip speed ratio of a wind turbine according to the embodiment of FIG. 3.

Reference is made to FIG. 3. In step S310, a relationship value indicating a predetermined relationship, between a utilization-rate coefficient for wind energy and the tip speed ratio of the wind turbine, is determined based on the current rotation speed and the current outputted active power.

The predetermined relationship may be obtained by using a relation including the rotation speed, the outputted active power, the utilization-rate coefficient for wind energy, and the tip speed ratio.

In some embodiments, the predetermined relationship is a ratio of the utilization-rate coefficient for wind energy to a cube of the tip speed ratio of the wind turbine. In such case, the ratio of the utilization-rate coefficient for wind energy to the cube of the tip speed ratio of the wind turbine is determined based on the current rotation speed and the current outputted active power.

For example, the ratio is proportional to the current outputted active power and a power loss, and inversely proportional to an air density, a fifth power of an impeller radius of the wind power generator of the wind turbine, and a cube of the current rotation speed. The ratio may be derived based on such relationship. The following equation (1) shows a specific relationship between the ratio and these parameters.

$$\frac{C_P}{\lambda^3} = \frac{2(P_{out} + P_{loss})}{\rho \pi R^5 \omega^3} \tag{1}$$

$C_p$ represents the utilization-rate coefficient for wind energy of the wind turbine, $\lambda$, represents a current tip speed ratio, $P_{out}$ represents the current outputted active power of the wind turbine, $P_{loss}$ represents a power loss, p represents the air density, R represents an impeller radius, and w represents the current rotation speed of the rotor of the wind power generator.

It should be understood that the relationship between the utilization-rate coefficient for wind energy and the tip speed ratio may be obtained by using other relations including the rotation speed, the outputted active power, the utilization-rate coefficient for wind energy and the tip speed ratio. A calculation method may be selected according to accuracy, a difficulty in obtaining parameters and a calculation complexity.

In step S320, a current tip speed ratio of the wind turbine is determined based on a current pitch angle of the wind turbine and the determined relationship value.

In some embodiments, a correspondence among the pitch angle, the relationship value (or the utilization-rate coefficient for wind energy), and the tip speed ratio (for example, a predetermined relationship table recording a mapping relationship among the pitch angle, the relationship value (or the utilization-rate coefficient for wind energy) and the tip speed ratio) is pre-determined. Thereby, the current tip speed ratio, corresponding to the current pitch angle and the determined relationship value, are obtained based on the correspondence.

The predetermined relationship table records a mapping relationship between the tip speed ratio, the pitch angle, and the utilization-rate coefficient for wind energy. That is to say, one corresponding parameter may be determined based on the other two of the above parameters, or a combination of two parameters (i.e., a parameter pair consisting of the other two parameters) may be determined based on the other parameter. For example, the predetermined relationship table may be a table for finding a corresponding utilization-rate coefficient for wind energy based on the tip speed ratio and the pitch angle. In such case, the corresponding utilization-rate coefficient for wind energy may be determined based on a certain tip speed ratio and a certain pitch angle. Further, the predetermined relationship table may be acquired, by obtaining utilization-rate coefficients for wind energy corresponding to different tip speed ratios and different pitch angles via a pre-established aerodynamic model of the wind turbine.

Hereinafter Table 1 shows an example of the predetermined relationship table according to the present disclosure.

TABLE 1

| $C_p$ | $\beta_1$ | ... | $\beta_n$ |
|---|---|---|---|
| $\lambda_1^3$ | $C_{p11}$ | ... | $C_{p1n}$ |
| ... | ... | ... | ... |
| $\lambda_m^3$ | $C_{pm1}$ | ... | $C_{pmn}$ |

As shown in Table 1, Table 1 shows utilization-rate coefficients for wind energy (i.e., $C_{p11}$ to $C_{pmn}$) corresponding to different combinations of the pitch angles (i.e., n pitch angles flu to $\beta_n$) and the cubes of the tip speed ratios (i.e., cubes of m tip speed ratios $\lambda_1^3$ to $\lambda_m^3$). In such case, the corresponding utilization-rate coefficient for wind energy may be determined from Table 1 based on the pitch angle and the tip speed ratio. Or, corresponding combinations of the tip speed ratio and the utilization-rate coefficient for wind energy (i.e., a parameter pair consisting of the tip speed ratio and the utilization-rate coefficient for wind energy) may be determined based on the pitch angle.

It should be understood that the cube of the tip speed ratio is used in Table 1 in order to speed up a search, and the tip speed ratio (i.e., a first power of the tip speed ratio) may be used directly.

Figure 8:
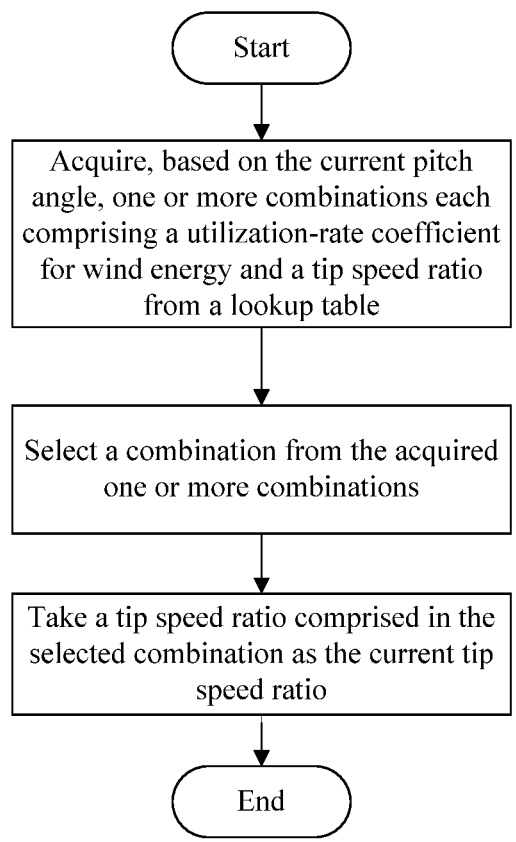
FIG. 8 shows a further specific process for determining a current tip speed ratio of a wind turbine according to an embodiment of the present disclosure.

In such case, reference may be made to FIG. 8 which shows a specific process for determining a current tip speed ratio of a wind turbine according to an embodiment of the present disclosure, and specifically, combinations of the utilization-rate coefficient for wind energy and the tip speed ratio corresponding to the current pitch angle are acquired from the predetermined relationship table (for example, in Table 1, if the current pitch angle is flu, combinations ($C_{p11}$, $\lambda_1^3$), ..., and ($C_{pm1}$, $\lambda_m^3$) of the utilization-rate coefficient for wind energy and the tip speed ratio corresponding to $\beta_1$ are acquired). A combination of which a relationship value, indicating the predetermined relationship, is closest to the determined relationship value is obtained from the acquired combinations of the utilization-rate coefficient for wind energy and the tip speed ratio (namely, a combination of which a value of $C_p/\lambda^3$ is closest to the relationship value determined in the step S310 is determined from the acquired combinations). A tip speed ratio of the obtained combination is taken as the current tip speed ratio (for example, $\lambda_1$ is taken as the current tip speed ratio in a case that the relationship value $C_{p11}/\lambda_1^3$, indicating the predetermined relationship of ($C_{p11}$, $\lambda_1^3$), is closest to the relationship value determined in the step S310).

Returning to FIG. 2, in step S220, an effective wind speed of the wind turbine is determined based on the current tip speed ratio and the current rotation speed. For example, the effective wind speed may be determined based on various relationships between the current tip speed ratio, the current rotation speed and the effective wind speed. In some embodiments, the effective wind speed of the wind turbine is determined based on the current tip speed ratio, the current speed, and the impeller radius of the wind power generator.

Hereinafter equation (2) shows calculation of the effective wind speed of the wind turbine.

$$U_e = \frac{\omega R}{\lambda} \quad (2)$$

$U_e$ is the effective wind speed, $\lambda$ represents the current tip speed ratio, $\omega$ represents the current rotation speed of the rotor of the wind power generator, and R is the impeller radius.

With the method for detecting the effective wind speed according to the embodiment of the present disclosure, the effective wind speed of the wind turbine may be determined accurately and quickly (for example, the effective wind speed may be determined in an order of seconds or even millimeters). Thereby, requirement on fast response speed of the primary frequency regulation of the wind turbine is met.

Returning to FIG. 1, in step S130, a maximum active power capable to be captured by the wind turbine at the current rotation speed is determined based on the effective wind speed and a maximum utilization-rate coefficient for wind energy of the wind turbine at the current rotation speed.

Figure 9:
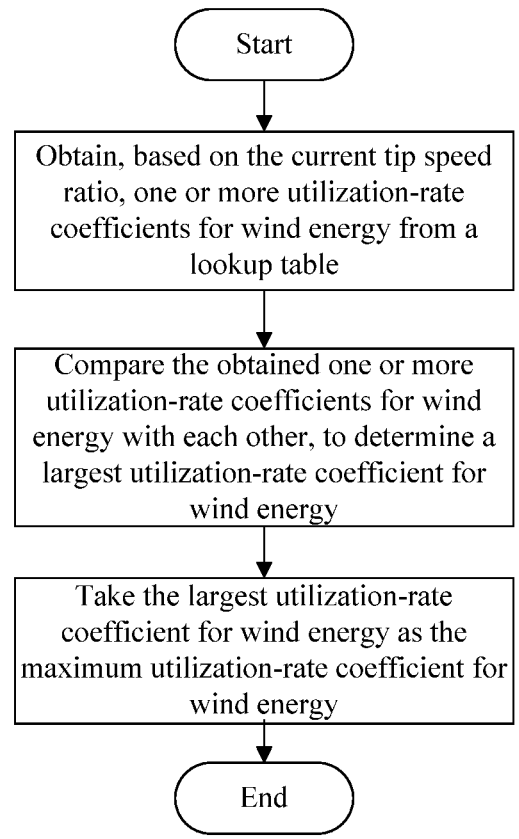
FIG. 9 shows a specific process for determining a maximum utilization-rate coefficient for wind energy according to an embodiment of the present disclosure.

In some embodiments, the maximum utilization-rate coefficient for wind energy of the wind turbine at the current rotation speed may be obtained by the predetermined relationship table as described above. Reference may be made to FIG. 9 which shows a specific process for determining a maximum utilization-rate coefficient for wind energy according to an embodiment of the present disclosure. Specifically, utilization-rate coefficients for wind energy corresponding to the current tip speed ratio may be obtained from the predetermined relationship table (for example, in Table 1, if the current tip speed ratio is $\lambda_m$, the corresponding utilization-rate coefficients for wind energy include $C_{pm1}$, ..., and $C_{pmn}$). A largest utilization-rate coefficient for wind energy among the obtained utilization-rate coefficients for wind energy is taken as the maximum utilization-rate coefficient for wind energy. In a case that the tip speed ratio is unchanged for a certain period of time, the rotation speed is also unchanged. Therefore, the maximum utilization-rate coefficient for wind energy at the corresponding rotation speed may be determined based on the tip speed ratio.

In a case that the maximum utilization-rate coefficient for wind energy is obtained, the maximum active power capable to be captured by the wind turbine at the current rotation speed may be obtained based on the effective wind speed, the current rotation speed, and a parameter of the wind turbine. Namely, the maximum active power capable to be captured without a change of the effective wind speed and the rotation speed may be obtained.

For example, the maximum active power capable to be captured may be calculated based on following equation (3).

$$P_{in\_max} = \frac{\rho \pi C p_{max} R^5 \omega^3}{\lambda^3} \quad (3)$$

$P_{in\_max}$ represents the maximum active power capable to be captured, $\lambda$ represents the current tip speed ratio, w represents the current rotation speed of the rotor of the wind turbine, R is the impeller radius, $Cp_{max}$ represents the maximum utilization-rate coefficient for wind energy, and $\rho$ represents the air density.

In step S140, a release power is determined, at which the wind turbine is capable to release rotation kinetic energy of the wind turbine for a predetermined time at the current rotation speed.

The predetermined time is a length of time, during which the wind turbine is required to keep an output power in a rising state in primary frequency-regulation. Given that the wind turbine is ensured to operate stably without being off-grid, the kinetic energy released by the wind turbine should not cause an excessive drop of the rotation speed of the rotor of the wind turbine (for example, being less than or equal to a switching-in speed for grid connection of the wind turbine). Therefore, the release power satisfies a following condition: the wind turbine is operable at a speed greater than the switching-in speed for grid connection of the wind turbine, after releasing, at the release power, the rotation kinetic energy of the wind turbine for the predetermined time at the current rotation speed.

The release power may be calculated based on following equation (4).

$$P_{rotating} = \frac{1}{2} J(\omega^2 - (k\omega_{cut\_in})^2)/T \quad (4)$$

$P_{rotating}$ represents the release power, J represents rotation moment of inertia of the wind turbine, w represents the current rotation speed of the rotor of the wind power generator, $\omega_{cut\_in}$ represents the switching-in speed for grid connection of the wind turbine, k is a rotation speed coefficient which is greater than 1, and T represents the predetermined time.

Magnitude of k may be adjusted so that the kinetic energy released by the wind turbine would not cause the excessive drop of the rotation speed of the rotor of the wind power generator (for example, being less than or equal to the switching-in speed for grid connection of the wind turbine). Namely, magnitude of k may be adjusted, so that the wind turbine may operate at a speed greater than the switching-in speed for grid connection of the wind turbine after releasing, at the release power, the rotation kinetic energy of the wind turbine for the predetermined time at the current rotation speed.

According to the present disclosure, a sequence of performing the step S130 and the step S140 is not limited. The step S130 and the step S140 may be simultaneously performed, or first the step S130 is performed and then the step S140 is performed, or first the step S140 is performed and then the step S130 is performed.

In step S150, an available active power of the wind turbine is determined based on the maximum active power capable to be outputted, the release power, and the current outputted active power.

Figure 10:
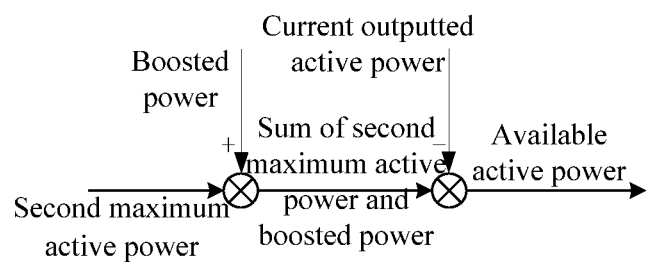
FIG. 10 shows a further specific process for determining an available active power of a wind turbine according to an embodiment of the present disclosure.
Figures 11, 12:
FIG. 11 shows a schematic structural diagram of a wind farm according to an embodiment of the present disclosure.
FIG. 12 shows an example of a lookup table according to an embodiment of the present disclosure.

Reference may be made to FIG. 10 which shows a specific process for determining an available active power of a wind turbine according to an embodiment of the present disclosure. Specifically, a sum of the maximum active power capable to be outputted and the release power is calculated, and the current outputted active power is subtracted from the calculated sum, thereby obtaining the available active power of the wind turbine.

Hereinafter a device for detecting an available active power of a wind turbine according to an embodiment of the present disclosure is described in conjunction with FIG. 4.

Figure 4:
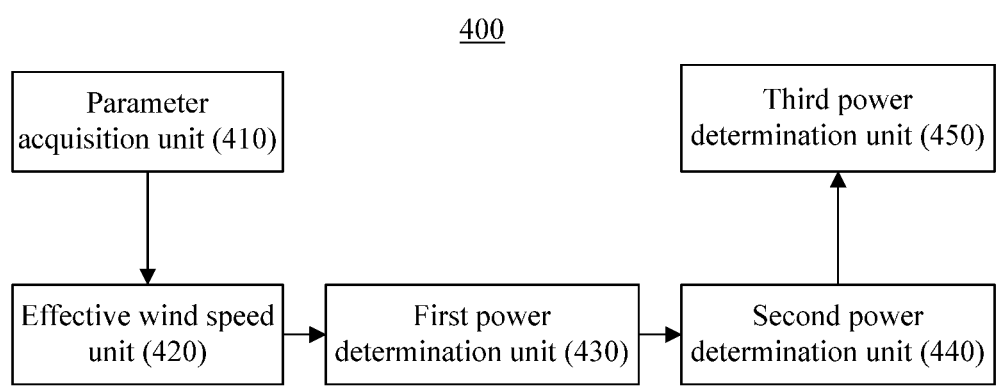
FIG. 4 is a block diagram of a device for detecting available active power of a wind turbine according to an embodiment of the present disclosure.

FIG. 4 shows a block diagram of a device for detecting an available active power of a wind turbine according to an embodiment of the present disclosure.

As shown in FIG. 4, the device 400 for detecting an effective wind speed of a wind turbine according to an embodiment of the present disclosure includes a parameter acquisition unit 410, an effective wind speed unit 420, a first power determination unit 430, a second power determination unit 440, and a third power determination unit 450.

The parameter acquisition unit 410 acquires a current rotation speed of a rotor of a wind power generator of a wind turbine and the current outputted active power of the wind turbine. The current rotation speed of the rotor and the current outputted active power of the wind turbine may be obtained in various ways, which is not limited by the present disclosure.

The effective wind speed unit 420 determines an effective wind speed of the wind turbine, based on the current rotation speed and the current outputted active power. The effective wind speed unit 420 may determine the effective wind speed of the wind turbine based on various relationships between the current rotation speed and the current outputted active power and the effective wind speed of the wind turbine.

In some embodiments, the effective wind speed unit 420 includes a tip speed ratio unit and an effective wind speed detection unit. The tip speed ratio unit determines a current tip speed ratio of the wind turbine, based on the current rotation speed and the current outputted active power. The effective wind speed detection unit determines the effective wind speed of the wind turbine, based on the current tip speed ratio and the current rotation speed.

In some embodiments, the tip speed ratio unit includes a relationship determination unit and a tip speed ratio determination unit.

The relationship determination unit determines a relationship value indicating a predetermined relationship between a utilization-rate coefficient for wind energy of the wind turbine and the tip speed ratio, based on the current rotation speed and the current outputted active power. For example, the relationship determination unit may determine the relationship value in the manner of the step S310 shown in FIG. 3.

The tip speed ratio determination unit obtains the current tip speed ratio of the wind turbine, based on a current pitch angle of the wind turbine and the determined relationship value. For example, the tip speed ratio determination unit may determine the current tip speed ratio in the manner of the step S320 shown in FIG. 3.

The effective wind speed detection unit determines the effective wind speed of the wind turbine, based on the current tip speed ratio and the current rotation speed. For example, the effective wind speed of the wind turbine may be determined based on the current tip speed ratio, the current rotation speed, and the impeller radius of the wind power generator.

The first power determination unit 430 determines a maximum active power capable to be captured by the wind turbine at the current rotation speed, based on the effective wind speed and the maximum utilization-rate coefficient for wind energy of the wind turbine at the current rotation speed. For example, the first power determination unit 430 may determine the maximum active power capable to be captured in the manner of the step S140 shown in FIG. 1.

The second power determination unit 440 determines a maximum active power capable to be outputted by the wind turbine, based on the maximum active power capable to be captured and a corresponding power loss, and determines a release power at which the wind turbine is capable to release rotation kinetic energy of the wind turbine for a predetermined time at the current rotation speed. For example, the second power determination unit 440 may determine the release power in the manner of step S150 shown in FIG. 1.

The third power determination unit 450 determines an available active power of the wind turbine, based on the maximum active power capable to be outputted, the release power, and the current outputted active power. Specifically, the third power determination unit 450 calculates a sum of the maximum active power capable to be outputted and the release power, and subtracts the current outputted active power from the calculated sum, thereby obtaining the available active power of the wind turbine.

According to an embodiment of the present disclosure, a system for detecting an available active power of a wind turbine is further provided according to the present disclosure. The system includes a processor and a memory. The memory stores a computer program. The computer program when executed by the processor performs the method for detecting the available active power of the wind turbine according to the aforementioned embodiment of the present disclosure.

Moreover, it should be understood that various units in the device according to the exemplary embodiments of the present disclosure may be implemented as hardware components and/or software components. Those skilled in the art may implement the various units according to the defined processing performed by the various units, for example, by using a field programmable gate array (FPGA) or an application specific integrated circuit (ASIC).

Furthermore, the above method according to an exemplary embodiment of the present disclosure may be implemented as a computer program in a computer readable recording medium. Those skilled in the art may implement the computer program according to the description of the above method. The above method of the present disclosure is implemented when the computer program is executed in a computer.

The method, the device, and the system for detecting the available active power of the wind turbine according to the present disclosure may estimate the available active power of the wind turbine accurately, due to adopting the method for detecting the effective wind speed fast and accurately and considering the rotation kinetic energy. In addition, in case of being applied to determining the available active power for the process of the primary frequency regulation of the wind turbine, the detected available active power may meet the requirement on the active power of the primary frequency regulation to the most extent, under the premise that the wind turbine operates stably.

Although the present disclosure has been particularly shown and described with reference to the exemplary embodiments thereof, those skilled in the art should appreciate that various modification in form and detail can be made to the present disclosure without departing from the spirit and scope of the present disclosure as defined by the appended claims.

The invention claimed is:

1. A method for detecting an available active power of a wind turbine, comprising:
   acquiring a current rotation speed of a rotor of a wind turbine and a current outputted active power of the wind turbine;
   determining an effective wind speed of the wind turbine, based on the current rotation speed and the current outputted active power;
   determining a first maximum active power, based on the effective wind speed and a maximum utilization-rate coefficient for wind energy of the wind turbine at the current rotation speed, wherein the first maximum active power is to be acquired by the wind turbine through converting wind energy into electric energy at the current rotation speed;
   determining a second maximum active power, based on the first maximum active power and a corresponding power loss, and determining a boosted power, wherein the second maximum active power is to be outputted by the wind turbine, and the boosted power is generated by converting rotation kinetic energy of the wind turbine into the electric energy for a predetermined time; and
   determining an available active power of the wind turbine, based on the second maximum active power, the boosted power, and the current outputted active power.

2. The method according to claim 1, wherein determining the effective wind speed of the wind turbine comprises:
   determining a current tip speed ratio of the wind turbine, based on the current rotation speed and the current outputted active power; and
   determining the effective wind speed of the wind turbine, based on the current tip speed ratio and the current rotation speed.

3. The method according to claim 2, wherein determining the current tip speed ratio of the wind turbine comprises:
   determining, based on the current rotation speed and the current outputted active power, a relationship value indicating a predetermined relationship between a utilization-rate coefficient for wind energy of the wind turbine and a tip speed ratio of the wind turbine; and
   obtaining the current tip speed ratio of the wind turbine, based on a current pitch angle of the wind turbine and the determined relationship value.

4. The method according to claim 3, wherein obtaining the current tip speed ratio of the wind turbine comprises:
   acquiring, based on the current pitch angle, one or more combinations each comprising a utilization-rate coefficient for wind energy and a tip speed ratio from a lookup table, wherein the lookup table comprises a plurality of pitch angles, a plurality of tip speed ratios and a plurality of utilization-rate coefficients for wind energy, and the lookup table shows a correspondence among the tip speed ratios, the pitch angles and the utilization-rate coefficients for wind energy;
   selecting a combination from the acquired one or more combinations, such that a value calculated by using the selected combination according to the predetermined relationship is closest to the determined relationship value, wherein the predetermined relationship is a ratio of the utilization-rate coefficient for wind energy of the wind turbine to a cube of the tip speed ratio of the wind turbine; and taking a tip speed ratio comprised in the selected combination as the current tip speed ratio.

5. The method according to claim 2, wherein the maximum utilization-rate coefficient for wind energy is obtained by:

obtaining, based on the current tip speed ratio, one or more utilization-rate coefficients for wind energy from a lookup table, wherein the lookup table comprises a plurality of pitch angles, a plurality of tip speed ratios and a plurality of utilization-rate coefficients for wind energy, and the lookup table shows a correspondence among the tip speed ratios, the pitch angles, and the utilization-rate coefficients for wind energy;

comparing the obtained one or more utilization-rate coefficients for wind energy with each other, to determine a largest utilization-rate coefficient for wind energy; and taking the largest utilization-rate coefficient for wind energy as the maximum utilization-rate coefficient for wind energy.

6. The method according to claim 1, wherein determining the available active power of the wind turbine comprises:

calculating a sum of the second maximum active power and the boosted power, and subtracting the current outputted active power from the calculated sum.

7. The method according to claim 1, wherein the predetermined time is a length of time during which the wind turbine is required to keep an output power in a rising state.

8. The method according to claim 1, wherein the wind turbine is operable at a speed greater than a switching-in speed for connection of the wind turbine to a grid, after the wind turbine converts the rotation kinetic energy of the wind turbine into the electric energy for the predetermined time.

9. A computer readable storage medium storing a computer program, wherein the computer program when executed performs the method according to claim 1.

10. A system for detecting an available active power of a wind turbine, wherein the system comprises:

a processor; and a memory storing a computer program, wherein:

the computer program when executed by the processor configures the system to:

acquire a current rotation speed of a rotor of a wind turbine and a current outputted active power of the wind turbine;

determine an effective wind speed of the wind turbine, based on the current rotation speed and the current outputted active power;

determine a first maximum active power, based on the effective wind speed and a maximum utilization-rate coefficient for wind energy of the wind turbine at the current rotation speed, wherein the first maximum active power is to be acquired by the wind turbine through converting wind energy into electric energy at the current rotation speed;

determine a second maximum active power based on the first maximum active power and a corresponding power loss, and determine a boosted power, wherein the second maximum active power is to be outputted by the wind turbine, and the boosted power is generated by converting rotation kinetic energy of the wind turbine into the electric energy for a predetermined time; and determine an available active power of the wind turbine, based on the second maximum active power, the boosted power, and the current outputted active power.

11. The system according to claim 10, wherein the computer program when executed by the processor further configures the system to:

determine a current tip speed ratio of the wind turbine, based on the current rotation speed and the current outputted active power; and determine the effective wind speed of the wind turbine, based on the current tip speed ratio and the current rotation speed.

12. The system according to claim 11, wherein the computer program when executed by the processor further configures the system to:

determine, based on the current rotation speed and the current outputted active power, a relationship value indicating a predetermined relationship between a utilization-rate coefficient for wind energy of the wind turbine and a tip speed ratio of the wind turbine; and obtain the current tip speed ratio of the wind turbine, based on a current pitch angle of the wind turbine and the determined relationship value.

13. The system according to claim 12, wherein the computer program when executed by the processor further configures the system to:

acquire, based on the current pitch angle, one or more combinations each comprising a utilization-rate coefficient for wind energy and a tip speed ratio, from a lookup table, wherein the lookup table comprises a plurality of pitch angles, a plurality of tip speed ratios and a plurality of utilization-rate coefficients for wind energy, and the lookup table shows a correspondence among the tip speed ratios, the pitch angles and the utilization-rate coefficients for wind energy;

select a combination from the acquired one or more combinations, such that a value calculated by using the selected combination according to the predetermined relationship is closest to the determined relationship value, wherein the predetermined relationship is a ratio of the utilization-rate coefficient for wind energy of the wind turbine to a cube of the tip speed ratio of the wind turbine; and take a tip speed ratio comprised in the selected combination as the current tip speed ratio.

14. The system according to claim 11, wherein the computer program when executed by the processor further configures the system to:

obtain, based on the current tip speed ratio, one or more utilization-rate coefficients for wind energy from a lookup table, wherein the lookup table comprises a plurality of pitch angles, a plurality of tip speed ratios and a plurality of utilization-rate coefficients for wind energy, and the lookup table shows a correspondence among the tip speed ratios, the pitch angles, and the utilization-rate coefficients for wind energy;

compare the obtained one or more utilization-rate coefficients for wind energy with each other, to determine a lamest utilization-rate coefficient for wind enemy; and take the largest utilization-rate coefficient for wind energy as the maximum utilization-rate coefficient for wind energy.

15. The system according to claim 10, wherein the computer program when executed by the processor further configures the system to:

calculate a sum of the second maximum active power and the boosted power, and subtracting the current outputted active power from the calculated sum.

16. The system according to claim 10, wherein the predetermined time is a length of time during which the wind turbine is required to keep an output power in a rising state.

17. The system according to claim 10, wherein the wind turbine is operable at a speed greater than a switching-in speed for connection of the wind turbine to a grid, after the wind turbine converts the rotation kinetic energy of the wind turbine into the electric energy for the predetermined time.

* * * * *